Nov. 7, 1967 STEN-ERIC SVENSSON 3,351,164

AUTOMATIC SLACK ADJUSTERS FOR VEHICLE BRAKES

Original Filed Feb. 16, 1965

Inventor
Sten-Eric Svensson

By
Watson, Cole, Grindle & Watson
ATTORNEYS

3,351,164
AUTOMATIC SLACK ADJUSTERS FOR VEHICLE BRAKES
Sten-Eric Svensson, Docentgatan 5B, Malmo S, Sweden
Original application Feb. 16, 1965, Ser. No. 432,965. Divided and this application Mar. 14, 1967, Ser. No. 623,010
Claims priority, application Sweden, Feb. 27, 1964, 2,393/64
1 Claim. (Cl. 188—196)

ABSTRACT OF THE DISCLOSURE

An automatic slack adjuster for a vehicle brake, in which a braking lever is constructed in the form of a housing, in which are mounted a worm gear and a worm, the latter being coupled by a double rack member to toothed segment freely rotatable about the axis of rotation of the braking lever between stops of a stationary bracket anchored outside the housing.

This is a division of U.S. patent application Ser. No. 432,965 filed Feb. 16, 1965.

Background of the invention

This invention relates to an automatic slack adjuster for a vehicle brake system, and particularly to adjusters for air or vacuum operated brakes on automobiles, especially heavy automobiles such as buses or trucks.

The type of braking system to which the invention is applicable is that commonly used in motor vehicles of the kind referred to, viz. the type comprising a rotatably mounted braking lever and a braking shaft operable thereby for rotation about the axis of rotation of said lever. Ordinarily, the said braking shaft carries a cam which by rotation of the braking shaft urges the braking shoes against the inner cylindrical face of a braking drum against the action of a return spring.

In order to adjust the slack of braking systems of the kind described, it is known to construct the connection between the braking lever and the braking shaft in the form of a worm gear transmission, the worm gear of which is mounted in the braking lever to form an angularly adjustable connection between the braking lever and the braking shaft, and the worm meshing with the worm gear also being mounted in the lever so that by turning this worm, the worm gear may be angularly adjusted to adjust the slack.

Various proposals have also been made for constructing a braking system of the type described with means for automatically adjusting the slack by causing the said worm to be rotated when the slack has become excessive.

However, many of the known slack adjusters suffer from the drawback that they are very delicate and likely to be influenced so as to cause false adjustment of the slack when exposed to impacts from stones thrown against them during the operation of the vehicle. Likewise, there is a danger that mud or dirt may have access to controlling elements of the slack adjuster thereby detracting from the accuracy of its operation.

It is an object of the invention to devise an automatic slack adjuster of the type referred to, in which all the essential parts of the slack adjuster may be completely enclosed in a housing so as to be very little susceptible to disturbances from the sources mentioned and also from excessive wear.

Summary of the invention

According to the invention, an automatic slack adjuster for a vehicle brake system comprises a rotatably mounted braking lever constructed in the form of a housing, a braking shaft operable by said lever for rotation about the axis of rotation of said lever, said slack adjuster comprising a worm gear mounted in said housing to form an angularly adjustable connection between said braking lever and said braking shaft, a worm shaft mounted in said housing and carrying a worm engaging with said worm gear for the purpose of angularly adjusting same, a one-way coupling mounted in said lever co-axially with said worm shaft, said one-way coupling having two coupling parts one of which is rigidly connected with said worm shaft, a driving member mounted in said housing for rotation relative to said lever about the axis of rotation thereof, lost motion coupling means between said driving member and a stationary part of the vehicle, said lost motion coupling means extending into said housing, and transmission means in the form of a slidable member mounted in said housing and having rack teeth engaging with teeth of said driving member and the other one of said coupling parts.

Description of the preferred embodiment

Figure 1:
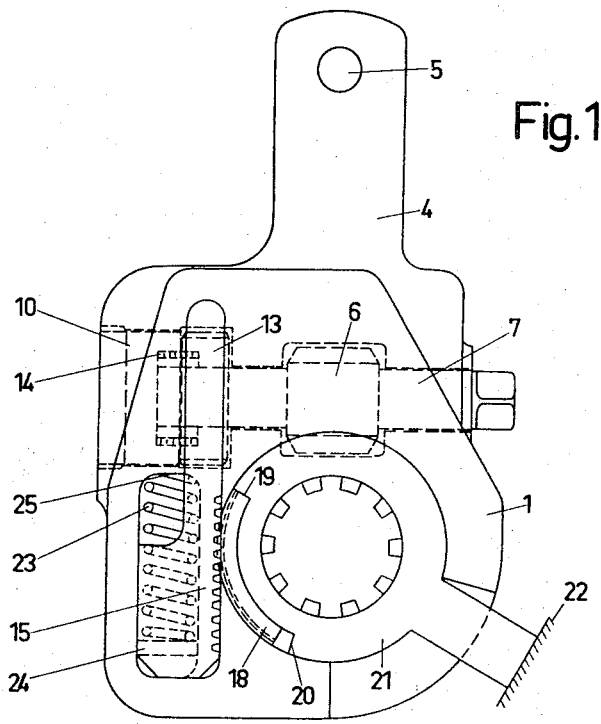
FIG. 1 shows an automatic slack adjuster according to an embodiment of the invention, in side elevational view with a side cover plate removed, FIG. 2 a section along the line II—II in FIG. 1, and FIG. 3 a section along the line III—III in FIG. 1.
Figure 2:
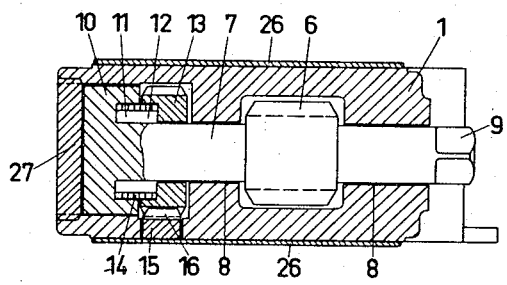
Figure 3:
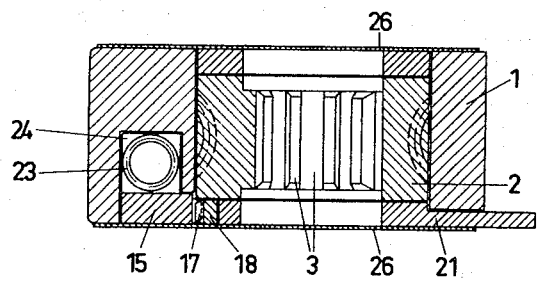

In FIGS. 1-3 a brake force transmitting lever includes a housing 1 in which a worm gear 2 is journalled. The said worm gear 2 is provided with interior grooves and ridges 3 for establishing a splined connection with a shaft (not shown) carrying a conventional cam for actuating the brake shoes in known manner.

The housing 1 is provided with an arm 4 having a hole 5 for connection to a rod (not shown) in a conventional cylinder-piston brake force source.

The worm gear 2 meshes with a worm 6 on a shaft 7 journalled in a bore 8 of the housing 1. One end 9 of the shaft 7 protrudes from the bore 8 and is square shaped thus being engageable by a wrench and manually adjustable. A turning of the shaft 7 will change the relative angular positions of the housing and the worm gear and thus the travel necessary for the piston in order to establish contact between the brake shoes and the brake drum, i.e. the slack in the brake force transmission.

The shaft 7 comprises a head portion 10 having an axially extending groove 11 matching a similar axial groove 12 in a gear wheel 13 journalled on the shaft 7. A one-way clutch in the form of a coiled spring 14 connects the head portion 10 with the gear wheel 13 so that rotation of the gear wheel 13 in one direction only (the slack reducing direction) will be transmitted to the head portion 11.

The gear wheel 13 meshes with a slide member 15 having two toothed racks 16 and 17, the rack 16 engaging the gear wheel 13 and the rack 17 engaging a loose segment 18 angularly displaceable between two stops 19 and 20 on a bracket 21 journalled in the housing 1 parallel to the worm gear 2 and rigidly connected to a part 22 of the chassis (not shown).

A compression spring 23 is arranged between a lug 24 on the slide member 15 and a seat 25 formed in the housing 1.

The cover plates 26 and a closure cap 27 prevent dirt from entering into the housing 1 and likewise prevent grease from escaping therefrom.

The device described will function as follows:

During application of the brake the housing 1 is turned counter-clockwise—as viewed in FIG. 1—while the bracket 21 remains stationary. The segment 18 will follow the angular movement of the housing 1 until it engages the stop 20 on the bracket 21. If the rotation of the housing stops at this moment or before, the segment 18 will simply be moved back to its original position during the brake releasing stroke, and no adjustment of the slack will take place. If, however, the rotation of the housing is continued beyond the point where the segment 18 engages the stop 20 on the bracket 21, as an indication that the slack is too great, the segment 18 will now remain stationary and the slide member 15 will therefore be moved upwards relative to the housing 1 and the spring 23 will be compressed. Simultaneously the rack 16 will rotate the gear wheel 13 but the rotation of this wheel will not be transmitted by the one-way clutch 14. During the release of the brakes the force transmitted will generally be so great during the initial stage that the worm 6 is locked to the worm gear 2. After such return movement of the housing 1 that the segment 18 contacts the stop 19 on the bracket 21, the further travel of the housing in the brake release direction will cause a rotation of the gear wheel 13 in the slack reducing direction, the said movement being transmitted to the head portion 10 via the one-way clutch 14.

Thus, the worm 6 will displace the worm gear 2 relative to the housing 1 in the slack reducing direction.

The size of the slack in the brakes which may be diminished during each braking operation is determined by:

(a) The length of the braking stroke,
(b) The leverage in the adjustment transmission (worm and gear wheels),
(c) The angular distance between the segment 18 and the stop 20 on the bracket 21.

As will be seen in FIG. 1, it is not possible to move the housing 1 further in the clockwise direction (the brake release direction). The arcuate segment 18 cannot be turned further in this direction and the slide member 15 cannot be displaced further downwards. The worm gear 2 is influenced in the brake release direction by the return spring normally fitted in the brake drum for returning the brake blocks from the brake drum. Thus, the arcuate segment 18 is always in one and the same position when the brake is released. It is thereby obtained that the piston stroke travel at which the adjustment operation should be initiated is well defined.

I claim:

An automatic slack adjuster for a vehicle brake system comprising a rotatably mounted braking lever constructed in the form of a housing, a braking shaft operable by said lever for rotation about the axis of rotation of said lever, said slack adjuster comprising a worm gear mounted in said housing to form an angularly adjustable connection between said braking lever and said braking shaft, a worm shaft mounted in said housing and carrying a worm engaging with said worm gear for the purpose of angularly adjusting same, a one-way coupling mounted in said lever co-axially with said worm shaft, said one-way coupling having two coupling parts one of which is rigidly connected with said worm shaft, a driving member mounted in said housing for rotation relative to said lever about the axis of rotation thereof, lost motion coupling means between said driving member and a stationary part of the vehicle, said lost motion coupling means extending into said housing, and transmission means in the form of a slidable member mounted in said housing and having rack teeth engaging with teeth of said driving member and the other one of said coupling parts.

References Cited

UNITED STATES PATENTS 2,650,681    9/1963    Shively _____ 188—79.5

DUANE A. REGER, *Primary Examiner.*

UNITED STATES PATENT OFFICE
CERTIFICATE OF CORRECTION

Patent No. 3,351,164　　　　　　Dated　November 7, 1967

Inventor(s)　Sten-Eric Svensson

It is certified that error appears in the above-identified patent and that said Letters Patent are hereby corrected as shown below:

In the heading to the printed specification, after line 4, insert -- assignor to Svenska Aktiebolaget Bromsregulator, Malmo, Sweden --.

Signed and sealed this 25th day of May 1971.

(SEAL)
Attest:

EDWARD M. FLETCHER, JR.　　　　　WILLIAM E. SCHUYLER, JR.
Attesting Officer　　　　　　　　　Commissioner of Patents